(12) United States Patent
Ishikawa et al.

(10) Patent No.: US 11,185,979 B2
(45) Date of Patent: Nov. 30, 2021

(54) PICKING SYSTEM AND METHOD FOR CONTROLLING SAME

(71) Applicant: Panasonic Intellectual Property Management Co., Ltd., Osaka (JP)

(72) Inventors: Takeshi Ishikawa, Hyogo (JP); Yoshihiko Matsukawa, Nara (JP); Osamu Mizuno, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 341 days.

(21) Appl. No.: 16/334,806

(22) PCT Filed: Nov. 2, 2017

(86) PCT No.: PCT/JP2017/039705
§ 371 (c)(1),
(2) Date: Mar. 20, 2019

(87) PCT Pub. No.: WO2018/096902
PCT Pub. Date: May 31, 2018

(65) Prior Publication Data
US 2020/0016742 A1    Jan. 16, 2020

(30) Foreign Application Priority Data
Nov. 22, 2016    (JP) .............................. JP2016-227189

(51) Int. Cl.
*B25J 9/16*    (2006.01)
*G06N 20/00*    (2019.01)
(Continued)

(52) U.S. Cl.
CPC ............. *B25J 9/163* (2013.01); *B25J 9/1697* (2013.01); *B25J 13/06* (2013.01); *B25J 13/085* (2013.01);
(Continued)

(58) Field of Classification Search
USPC .................................................. 700/245–264
See application file for complete search history.

(56) References Cited

U.S. PATENT DOCUMENTS 9,327,397 B1 *    5/2016    Williams ................... B25J 3/04
9,486,921 B1 *    11/2016    Straszheim ............ B25J 9/1679
(Continued)

FOREIGN PATENT DOCUMENTS

| JP | H08-069313 A | 3/1996 |
| JP | 2010-089211 A | 4/2010 |
| JP | 2014-180736 A | 9/2014 |

OTHER PUBLICATIONS

International Search Report issued in Patent Application No. PCT/JP2017/039705 dated Jan. 30, 2018.
(Continued)

*Primary Examiner* — Jonathan L Sample
(74) *Attorney, Agent, or Firm* — Pearne & Gordon LLP

(57) ABSTRACT

A picking system including: a picking robot for gripping a target; an operation unit for an operator to perform a remote operation of the picking robot; a learning unit that learns a movement of the picking robot when the target is gripped by the remote operation; and an assisting unit that assists the remote operation based on a learning result of the learning unit.

7 Claims, 11 Drawing Sheets

(51) Int. Cl.
*B25J 13/06* (2006.01)
*B25J 13/08* (2006.01)
*B25J 15/00* (2006.01)
*B25J 19/02* (2006.01)

(52) U.S. Cl.
CPC ............ *B25J 13/088* (2013.01); *B25J 15/00* (2013.01); *B25J 19/023* (2013.01); *G06N 20/00* (2019.01)

(56) References Cited

U.S. PATENT DOCUMENTS

| | | | | |
|---|---|---|---|---|
| 9,802,317 | B1* | 10/2017 | Watts | B25J 9/1687 |
| 10,105,841 | B1* | 10/2018 | Szatmary | G06N 3/008 |
| 10,131,052 | B1* | 11/2018 | Ibarz Gabardos | B25J 9/161 |
| 10,166,676 | B1* | 1/2019 | Hudson | B25J 13/085 |
| 10,717,196 | B2* | 7/2020 | Yamazaki | B25J 9/1612 |
| 2006/0253223 | A1* | 11/2006 | Bodenheimer, Jr. | B25J 13/00 700/245 |
| 2009/0234501 | A1* | 9/2009 | Ishizaki | G06T 1/0014 700/259 |
| 2009/0234502 | A1* | 9/2009 | Ueyama | B25J 9/1697 700/259 |
| 2010/0172733 | A1* | 7/2010 | Chalubert | B25J 9/1671 414/730 |
| 2012/0130541 | A1* | 5/2012 | Szalek | B25J 13/085 700/258 |
| 2012/0191245 | A1* | 7/2012 | Fudaba | B25J 3/04 700/254 |
| 2012/0253516 | A1* | 10/2012 | Iida | B25J 13/082 700/258 |
| 2013/0030570 | A1* | 1/2013 | Shimizu | G05D 1/0246 700/259 |
| 2013/0041508 | A1* | 2/2013 | Hu | B25J 9/1689 700/259 |
| 2013/0184871 | A1* | 7/2013 | Fudaba | B25J 13/081 700/264 |
| 2013/0345872 | A1* | 12/2013 | Brooks | G06F 17/00 700/259 |
| 2014/0371912 | A1* | 12/2014 | Passot | G06N 3/008 700/264 |
| 2015/0217450 | A1* | 8/2015 | Huang | B25J 9/1671 700/259 |
| 2016/0016311 | A1* | 1/2016 | Konolige | B25J 15/0616 700/245 |
| 2016/0250753 | A1* | 9/2016 | Yoshizawa | B25J 15/0466 700/258 |
| 2017/0190052 | A1* | 7/2017 | Jaekel | G06N 20/00 |
| 2018/0236666 | A1* | 8/2018 | Mozeika | B25J 13/065 |

OTHER PUBLICATIONS

Written Opinion issued in Patent Application No. PCT/JP2017/039705 dated Jan. 30, 2018.

* cited by examiner

FIG. 5

| No | ARTICLE NAME | ARTICLE NUMBER | JAN CODE | NUMBER OF TARGETS | LOCATION | SIZE (LENGTH×WIDTH×HEIGHT (mm)) | WEIGHT (g) |
|---|---|---|---|---|---|---|---|
| 1 | HOME APPLIANCE A | AA-01 | 4912345678901 | 2 | K-002-12 | 100×80×150 | 1300 |
| 2 | HOME APPLIANCE B | AF-13 | 4912345678902 | 1 | K-001-24 | 120×250×40 | 850 |
| 3 | GENERAL MERCHANDISE C | CB-32 | 4912345678903 | 4 | Z-030-01 | 100×100×150 | 350 |
| 4 | GENERAL MERCHANDISE D | CG-86 | 4912345678904 | 3 | Z-030-56 | 80×80×150 | 300 |
| 5 | DAILY NECESSITY E | EA-69 | 4912345678905 | 5 | N-001-37 | 75×80×180 | 500 |
| 6 | DAILY NECESSITY F | ED-52 | 4912345678906 | 7 | K-332-43 | 80×60×75 | 450 |
| 7 | DAILY NECESSITY G | EE-08 | 4912345678907 | 2 | K-401-28 | 40×80×170 | 120 |
| ... | ... | ... | ... | ... | ... | ... | ... |

PICKING SYSTEM AND METHOD FOR CONTROLLING SAME

TECHNICAL FIELD

The present disclosure relates to a picking system and a method for controlling the same.

BACKGROUND ART

In the related art, a technique for performing picking by a robot is known. In addition, a technique for performing picking by a remote operation is also known (for example, see PTL 1).

CITATION LIST

Patent Literature

PTL 1: Japanese Patent Unexamined Publication No. 2010-89211

SUMMARY OF THE INVENTION

A picking system according to an aspect of the present disclosure includes a picking robot for gripping a target; an operation unit for an operator to perform a remote operation of the picking robot; a learning unit that learns a movement of the picking robot when the target is gripped by the remote operation; and an assisting unit that assists the remote operation based on a learning result of the learning unit.

The present disclosure can provide a picking system or a method for controlling the same capable of reducing a labor of an operator while suppressing an increase in cost.

BRIEF DESCRIPTION OF DRAWINGS

FIG. 5 is a table illustrating an example of a picking list according to Exemplary embodiment 1.

DESCRIPTION OF EMBODIMENTS

Figure 1:
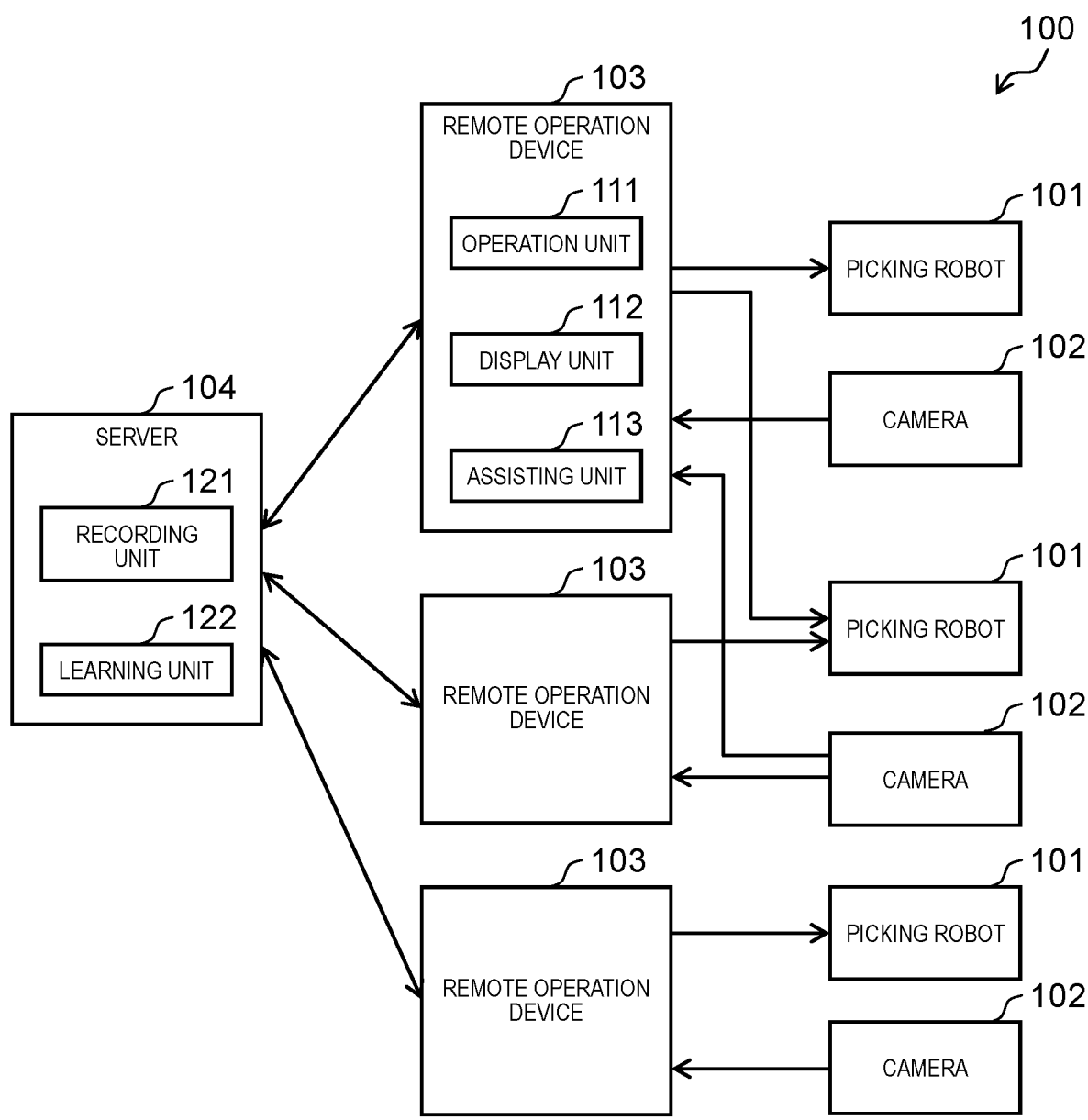
FIG. 1 is a diagram illustrating a configuration of a picking system according to Exemplary embodiment 1.

Prior to describing exemplary embodiments, a problem in the related art will be briefly described.

In a picking system of the related art, it is desired to reduce a labor of an operator by automation. However, in a case where types of targets are small, there is a possibility that the automation can be realized by performing teaching for each type, but in a case where the types of the targets are large, there is a problem that the cost of the teaching increases. For example, in a distribution center, tens of thousands items are picked and it is not realistic to perform teaching with respect to all of them.

Therefore, the present disclosure is to provide a picking system or a method for controlling the same capable of reducing a labor of an operator while suppressing an increase in cost.

A picking system according to an aspect of the present disclosure including: a picking robot for gripping a target; an operation unit for an operator to perform a remote operation of the picking robot; a learning unit that learns a movement of the picking robot when the target is gripped by the remote operation; and an assisting unit that assists the remote operation based on a learning result of the learning unit.

According to the configuration, since the remote operation can be assisted by using the learning result, the working efficiency of the operator can be improved. In addition, teaching becomes unnecessary by using learning, and it is possible to suppress an increase in cost in a case where the types of the targets are large. As described above, the picking system can reduce the labor of the operator while suppressing an increase in cost.

For example, the picking robot may include an arm portion, and a gripper that is connected to the arm portion and grips the target, and the assisting unit may automatically manipulate the arm portion based on the learning result, so that the gripper moves to a vicinity of the target.

According to the configuration, since at least a part of a picking operation by the picking robot using the learning result can be automated, a working amount of the operator can be reduced.

For example, the picking robot may include an arm portion, and a gripper that is connected to the arm portion and grips the target, the assisting unit may present the operator information for guiding the gripper to a vicinity of the target based on the learning result.

According to the configuration, since work of the operator can be assisted by using the learning result, a working time of the operator can be reduced.

For example, the learning unit may learn the movement of the picking robot when the target is gripped for each type of the target.

According to the configuration, even in a case where the types of the targets are large, the learning can be efficiently performed.

For example, the picking system may further include a camera that images the target, in which the learning unit may use an image obtained by the camera and an operation state of the picking robot during the remote operation obtained in time series to learn the movement of the picking robot when the target is gripped.

For example, the operation state of the picking robot may include a torque and an angle of a joint of the picking robot.

In addition, a control method according to an aspect of the present disclosure for controlling a picking system including a picking robot for gripping a target, and an operation unit for an operator to performs a remote operation of the picking robot, the method including: a learning step of learning a movement of the picking robot when the target is gripped by the remote operation; and an assisting step of assisting the remote operation based on a learning result of the learning step.

According to the configuration, since the remote operation can be assisted by using the learning result, the working efficiency of the operator can be improved. In addition, teaching becomes unnecessary by using learning, and it is possible to suppress an increase in cost in a case where the types of the targets are large. As described above, the controlling method can reduce the labor of the operator while suppressing an increase in cost.

Moreover, these generic or specific aspects may be realized by a system, a method, an integrated circuit, a computer program, or a recording medium such as a computer-readable CD-ROM, and may be realized by any combination of a system, a method, an integrated circuit, a computer program, and a recording medium.

Hereinafter, exemplary embodiments will be described in detail with reference to the drawings. Moreover, in the exemplary embodiments described below, all of the members described below illustrate one specific example of the present disclosure. Numerical values, shapes, materials, constituent elements, arrangement positions and connection modes of constituent elements, steps, order of steps, and the like illustrated in the following exemplary embodiments are mere examples and do not limit the present disclosure. In addition, among constituent elements in the following exemplary embodiments, constituent elements not described in the independent claims indicating a top level concept are described as arbitrary constituent elements.

Exemplary Embodiment 1

First, a configuration of picking system 100 according to the exemplary embodiment is described. FIG. 1 explains a configuration of picking system 100 according to the exemplary embodiment. Picking system 100 is, for example, a system for picking a target in a distribution center, and includes a plurality of picking robots 101, a plurality of cameras 102, a plurality of remote operation devices 103, and server 104. The devices are connected to each other, for example, via a network. Specifically, server 104 is connected to the plurality of remote operation devices 103, and each of remote operation devices 103 is connected to one or the plurality of picking robots 101, and one or the plurality of cameras 102.

Figure 2:
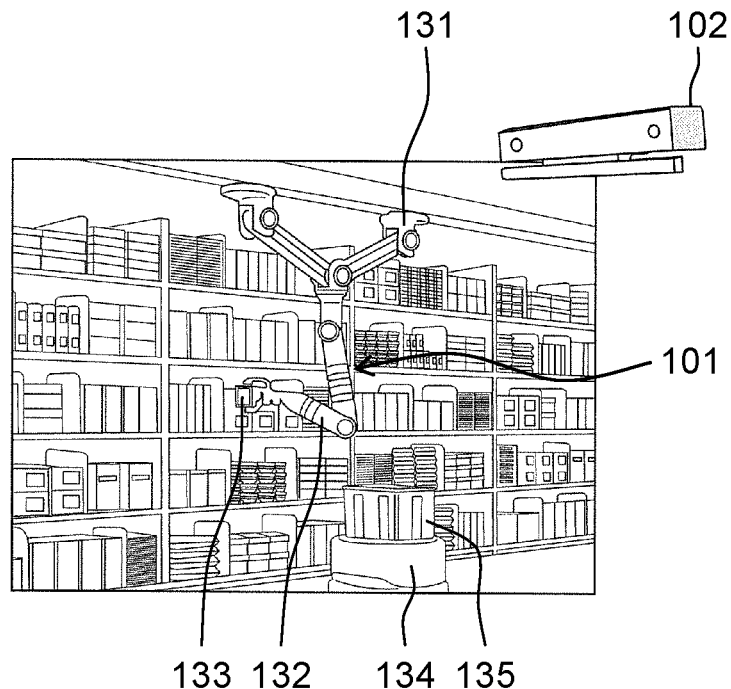
FIG. 2 is a view illustrating a configuration of a picking robot according to Exemplary embodiment 1.

The plurality of picking robots 101 and the plurality of cameras 102 are disposed, for example, in the distribution center. FIG. 2 is a view illustrating a configuration example of picking robot 101. As illustrated in FIG. 2, picking robot 101 includes moving portion 131, arm portion 132, gripper 133, and transporter 134.

Moving portion 131 is a mechanism for moving picking robot 101. In FIG. 2, a configuration in which the movement is performed along a rail disposed in an upper portion in the distribution center is illustrated, but the configuration of moving portion 131 is not limited thereto. For example, the rail may be provided on a floor side, or a configuration in which the rail is not used and which moves on a floor with wheels or the like may be used.

Arm portion 132 is, for example, an articulated robot arm, and can move gripper 133 at an arbitrary position within a predetermined distance.

Gripper 133 is connected to a tip of arm portion 132 and grips a target. Moreover, in FIG. 2, as gripper 133, a configuration in which the target is sandwiched, but a configuration in which the target can be gripped may be used, or for example, a configuration in which the target is sucked may be used.

Transporter 134 is movable, for example, in the distribution center, and transports transport box 135.

Moreover, the configuration of picking robot 101 illustrated in here is an example and the present disclosure is not limited thereto.

Camera 102 is disposed, for example, in the distribution center, and images the target or picking robot 101. Moreover, the number of cameras 102 may be arbitrary. In addition, each of cameras 102 may be a fixed camera, or may be mounted on picking robot 101.

Each of remote operation devices 103 is, for example, a personal computer operated by an operator (also referred to as a picker), and is disposed in a house of the operator or the like. Moreover, a displacement place of remote operation device 103 may be arbitrary place such as the distribution center, or a building other than the distribution center. Remote operation device 103 includes operation unit 111, display unit 112, and assisting unit 113.

Figure 3:
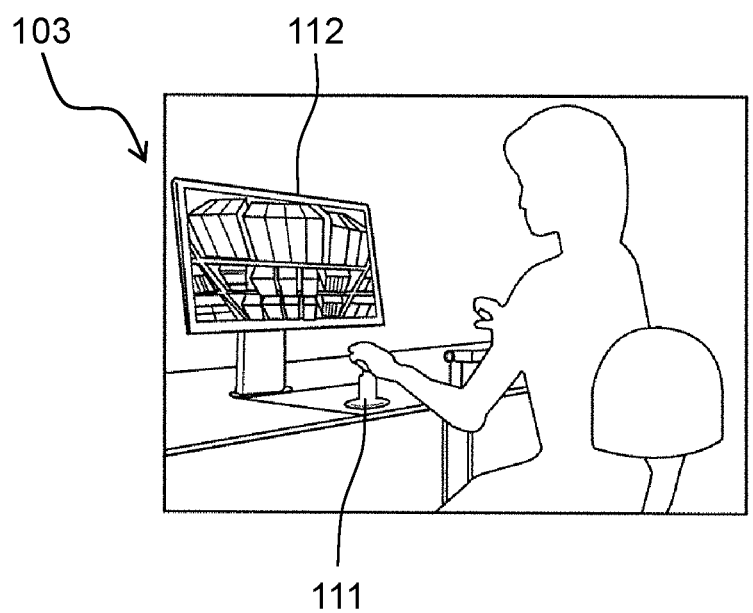
FIG. 3 is a view illustrating a configuration of a remote operation device according to Exemplary embodiment 1.

Operation unit 111 is an input interface used by the operator and, for example, as illustrated in FIG. 3, includes a plurality of operation levers or the like. Display unit 112 is a display for displaying an image imaged by camera 102. Assisting unit 113 assists a remote operation based on a learning result which is described later. Specifically, assisting unit 113 automatically manipulates picking robot 101 based on the learning result or the like.

Server 104 includes recording unit 121 and learning unit 122. Recording unit 121 is a recording database that accumulates an operation history indicating the operation of picking robot 101 during the remote operation by remote operation device 103. Learning unit 122 learns a movement of the picking robot based on the accumulated operation history.

Figure 4:
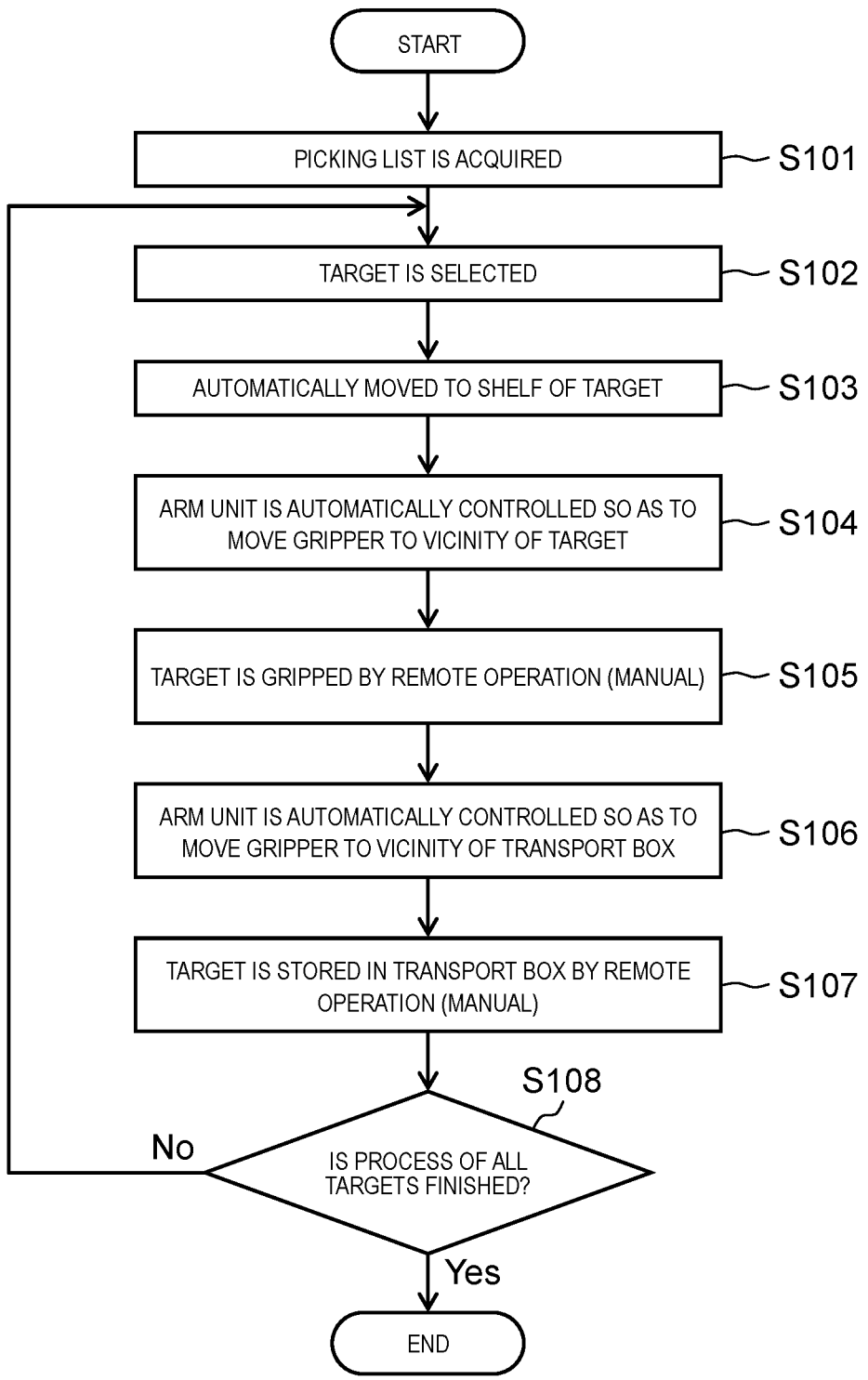
FIG. 4 is a flowchart of a picking process according to Exemplary embodiment 1.

Hereinafter, an operation of picking system 100 having such a configuration will be described. FIG. 4 is a flowchart of a flow of a picking process in picking system 100.

First, remote operation device 103 acquires a picking list of articles to be picked (S101). FIG. 5 is a table illustrating a configuration example of the picking list. As illustrated in FIG. 5, the picking list includes information (article name, article number, and JAN code) for specifying an article of a picking target, the number of articles to be picked, a location where the article is present, a size of the article, and a weight of the article. Moreover, it is not necessary that all of these pieces of information are included in the picking list, and only some of the information may be included in the picking list.

Next, remote operation device 103 selects one article from the picking list as the target (S102). For example, remote operation device 103 may select the articles in order from a top of the picking list, or may sequentially select the articles such that a moving distance is the shortest.

Figure 6:
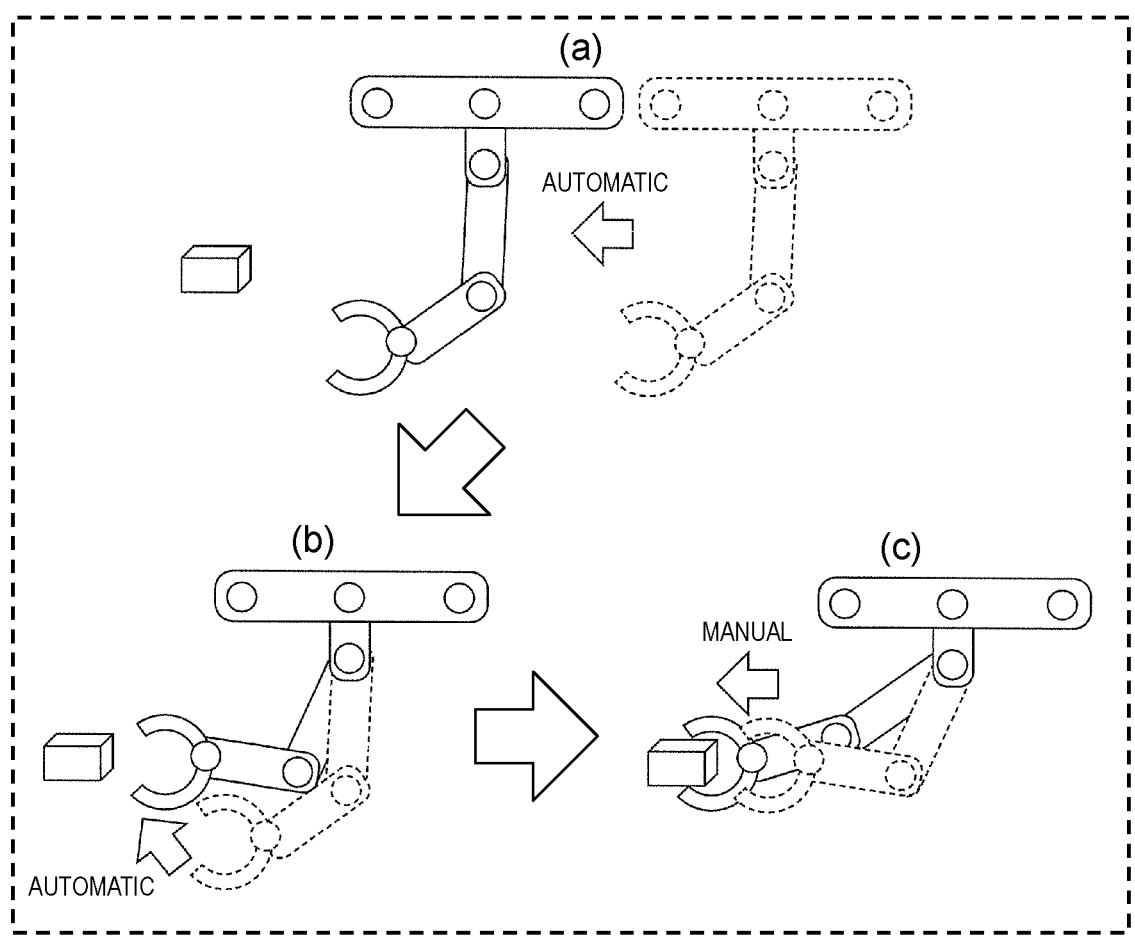
FIG. 6 is a view illustrating an operation of the picking robot according to Exemplary embodiment 1.

Next, remote operation device 103 automatically manipulates moving portion 131 to move picking robot 101 to a front of a shelf in which the target is stored (S103: (a) of FIG. 6). Specifically, remote operation device 103 refers to the picking list, specifies a storage location of the target, and moves picking robot 101 to the storage location.

Next, remote operation device 103 automatically manipulates arm portion 132 so that gripper 133 moves to a vicinity of the target (S104: (b) of FIG. 6). For example, the position of the shelf and the storage location (for example, a right side of a second row, or the like) of the target in the shelf are indicated by the picking list as the storage location of the target. In this case, remote operation device 103 moves gripper 133 to the vicinity of the storage location (for example, the right side of the second row, or the like).

Next, remote operation device 103 switches a manipulation method of picking robot 101 from the automatic manipulation to a manual manipulation. Remote operation device 103 grips the target in accordance with an operation of the operator on operation unit 111 (S105: (c) of FIG. 6).

Remote operation device 103 confirms that the target is gripped based on an image obtained by camera 102, a sensor output result, or an instruction from the operator, remote operation device 103 automatically manipulates arm portion 132, so that gripper 133 moves to the vicinity of transport box 135 (S106).

Next, remote operation device 103 switches the manipulation method of picking robot 101 from the automatic manipulation to the manual manipulation. Remote operation device 103 stores (packs) the target in transport box 135 in accordance with the operation of the operator on operation unit 111 (S107).

Moreover, in a case where the number of the targets is plural, the process of steps S104 to S107 is repeated.

In a case where the picking of all the targets included in the picking list is not completed (No in S108), a next target is selected (S102) and the process after step S103 is performed with respect to the selected target. On the other hand, in a case where the picking of all the targets included in the picking list is completed (Yes in S108), the process is finished and transporter 134 transports the transport box in which the articles are stored to a predetermined position.

Moreover, in the process, an example in which various processes are performed in remote operation device 103 is described, but acquisition (S101) of the picking list and the selecting process (S102) of the target may be performed by another device such as server 104. In addition, a part or all of the automatic control (S103, S104, and S106) of picking robot 101 may be performed in server 104 or picking robot 101.

As described above, in picking system 100 according to the exemplary embodiment, the movement of picking robot 101 to the shelf and the operation of arm portion 132 to the vicinity of the target can be automated, so that a working amount of the operator can be reduced. In addition, the gripping operation by picking robot 101, which is difficult to automate, is performed by the remote operation, so that the cost for realizing the automatic control of picking robot 101 can be reduced. As described above, picking system 100 according to the exemplary embodiment can achieve both the reduction of the working amount of the operator and the reduction of the cost.

Next, a learning process by picking system 100 according to the exemplary embodiment will be described. In picking system 100 according to the exemplary embodiment, the movement of the picking robot is learned by using the operation history of the remote operation, so that the accuracy of the automatic control can be improved and a range to which the automatic control is applied can be expanded.

Figure 7:
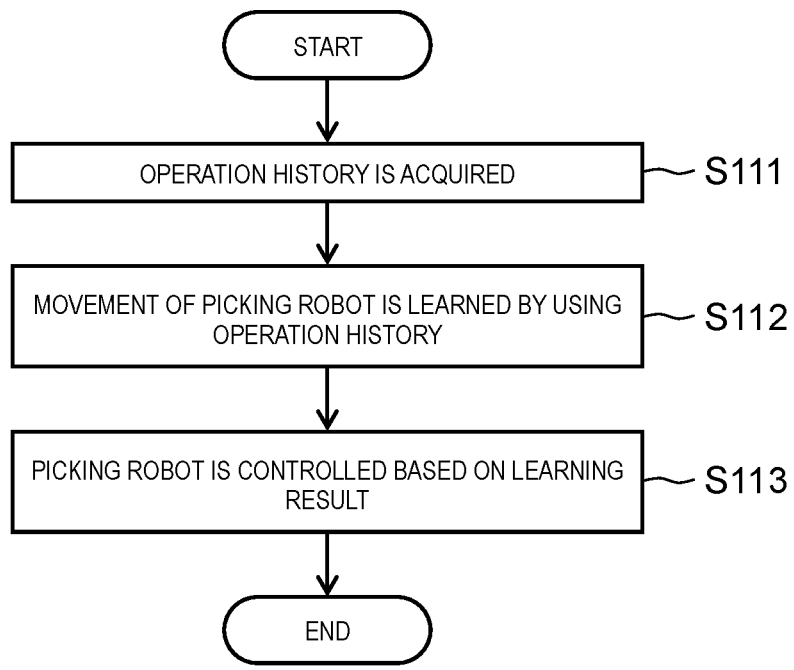
FIG. 7 is a flowchart of a learning process according to Exemplary embodiment 1.

FIG. 7 is a flowchart of the learning process in picking system 100. First, server 104 sequentially acquires the operation history of picking robot 101 performed in the plurality of remote operation devices 103 and stores the operation history in recording unit 121 (S111). For example, the operation histories acquired in steps S105 and S107 illustrated in FIG. 4 are sequentially transmitted from the plurality of remote operation devices 103.

Figure 8:
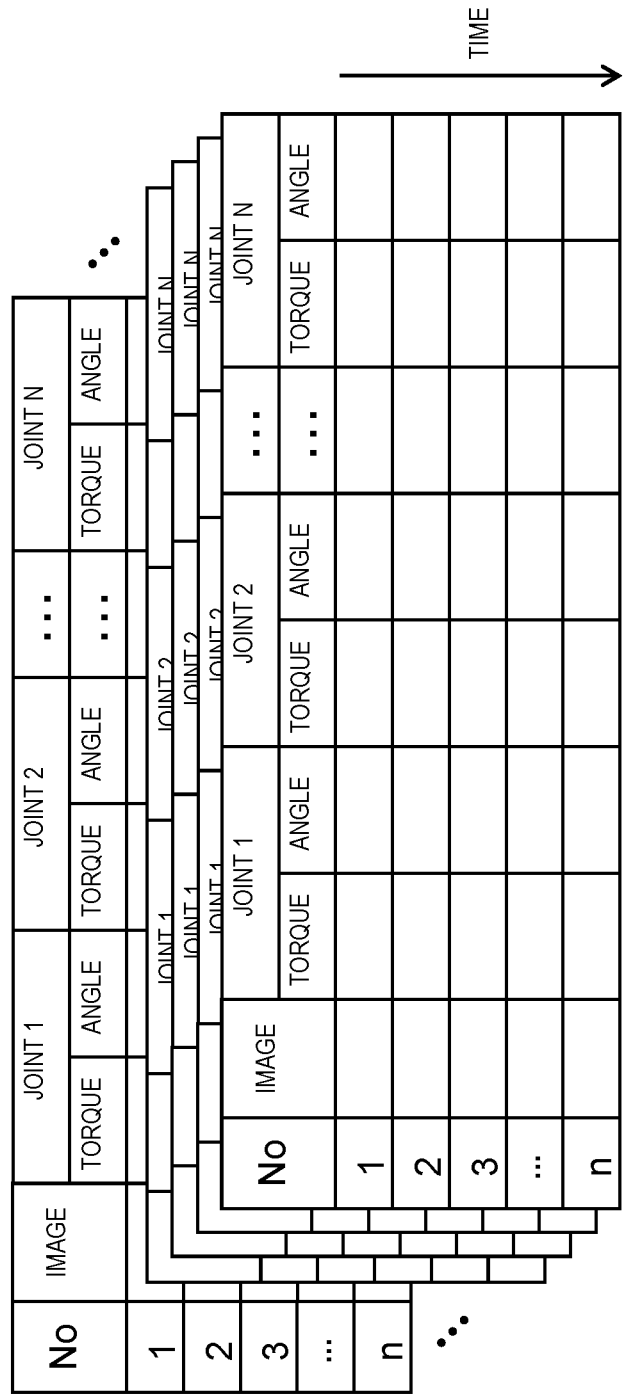
FIG. 8 is a view illustrating a configuration of an operation history used for learning according to Exemplary embodiment 1.

FIG. 8 is a view illustrating an example of the acquired operation history. Moreover, in FIG. 8, values of various pieces of information are omitted. As illustrated in FIG. 8, various operation histories include an image imaging the picking operation of picking robot 101 obtained by camera 102, and information indicating the operation state of picking robot 101 during the remote operation which are obtained in time series. Specifically, the operation state of picking robot 101 includes a torque and an angle of each joint of picking robot 101. More specifically, the operation state of picking robot 101 includes the operation state of arm portion 132 and the operation state of gripper 133. The operation state of arm portion 132 includes at least one of the torque, the angle, and an angular velocity of each joint of arm portion 132, a position, a velocity, and a posture of the tip of arm portion 132. Moreover, the position, the velocity, and the posture of the tip of arm portion 132 may be a position, a velocity, and a posture of gripper 133. In addition, the operation state of gripper 133 includes at least one of the torque (gripping force), the angle, and the angular velocity of each joint of gripper 133.

In addition, for example, in a case where a frame rate of the image imaged by camera 102 is 60 fps, an image and information indicating the operation state of picking robot 101 are obtained at intervals of 16.6 msec.

Next, learning unit 122 of server 104 creates control information for automatically controlling picking robot 101 by performing machine learning with a plurality of operation histories stored in recording unit 121 as an input (S112). Specifically, learning unit 122 performs the learning process for each type (for example, the article number or the JAN code illustrated in FIG. 5) of the target. Moreover, learning unit 122 may group types having the same or similar size and weight and perform learning for each group. In addition, only one of the size and the weight may be used for grouping.

In addition, only a valid operation history among the plurality of operation histories may be used for learning. For example, the operation history may include a time required for picking, and only those for which the time required for picking is shorter than a predetermined reference may be used for learning. In addition, the learning may be performed on the assumption that the shorter the time required for the picking is, the higher an effectiveness of the operation history is. In addition, it may be determined whether or not to use for the learning depending on the operator, or a degree of the effectiveness may be set. For example, the lower the experience of the operator, the lower of the effectiveness may be set.

Figure 9:
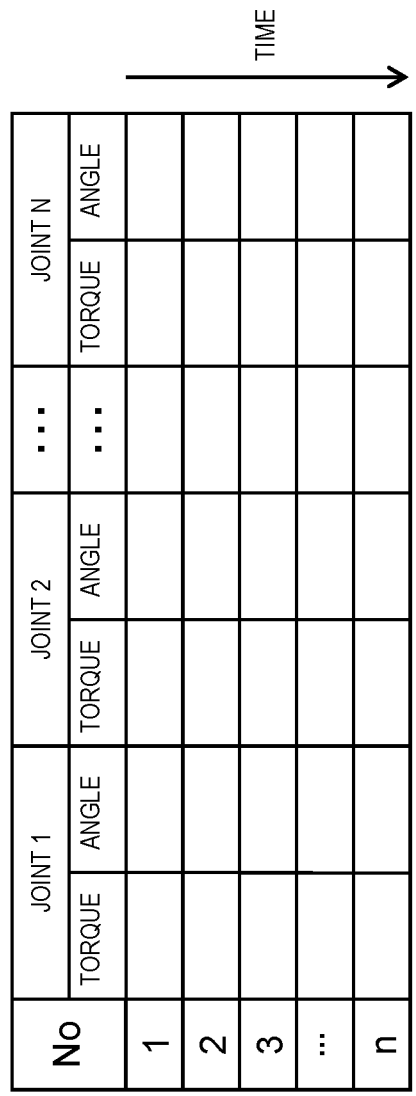
FIG. 9 is a table illustrating a configuration of control information based on a learning result according to Exemplary embodiment 1.

FIG. 9 is a table illustrating an example of the control information which is an output from learning unit 122. As illustrated in FIG. 9, the control information indicates the operation state of picking robot 101 during the remote operation in time series. That is, a state that picking robot 101 has to be taken is obtained in time series.

In addition, a method of the machine learning to be used is not particularly limited and any method such as a neutral network can be used.

Next, remote operation device 103 automatically controls picking robot 101 based on a learning result obtained in step S112 (S113). Specifically, as described in S104 of FIG. 4, remote operation device 103 automatically manipulates arm portion 132 based on the learning result, so that gripper 133 moves to the vicinity of the target. In addition, as described in S106 of FIG. 4, remote operation device 103 automatically manipulates arm portion 132 based on the learning result, so that gripper 133 moves to the vicinity of transport box 135.

Figure 10:
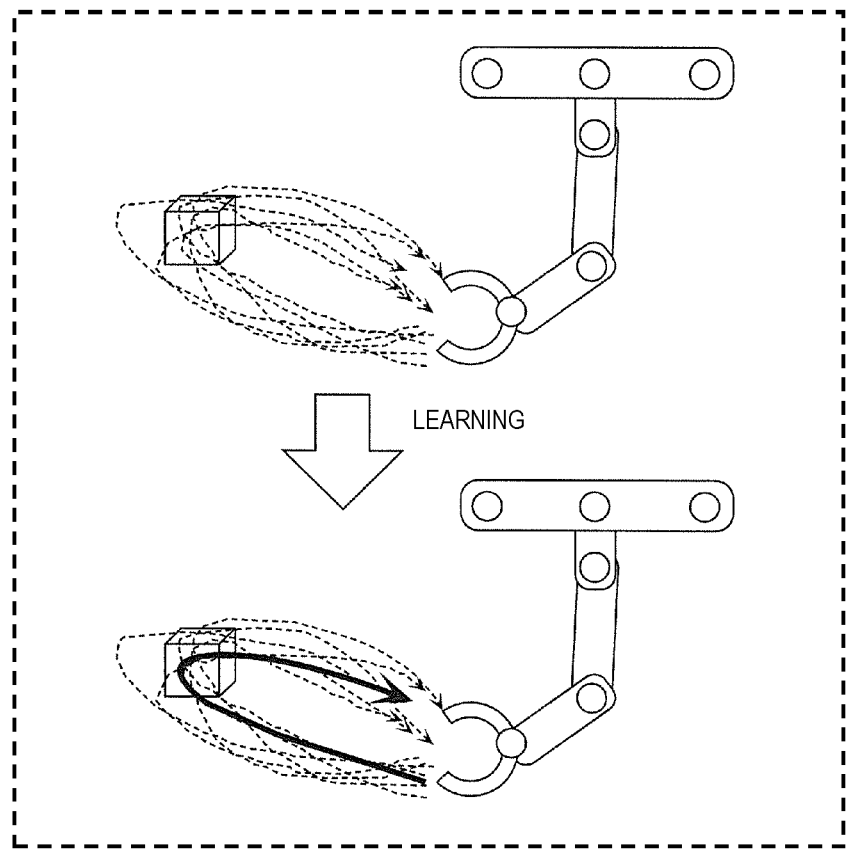
FIG. 10 is a view for explaining a learning operation according to Exemplary embodiment 1.

FIG. 10 is a view schematically illustrating a state of the learning. As illustrated in FIG. 10, the machine learning is performed based on a plurality of operation histories of similar picking work, so that a characteristic trajectory and operation are extracted. The automatic manipulation of picking robot 101 is performed so as to be the extracted trajectory and operation.

Figure 11:
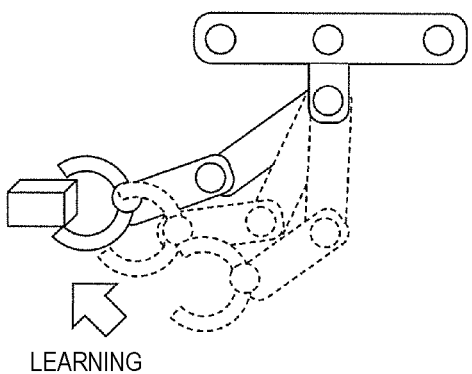
FIG. 11 is a view for explaining the learning operation according to Exemplary embodiment 1.

In addition, as illustrated in FIG. 11, a range in which picking robot 101 is automatically controlled is updated by the learning. For example, in the picking operation, as the learning progresses (as more operation histories are obtained), picking robot 101 is automatically controlled so that gripper 133 moves closer to the target. For example, automatic control is performed to a region in which a degree of variation in operation is equal to or less than a predetermined value based on a distribution of the plurality of operation histories or the like.

Moreover, in the operation illustrated in FIG. 4, the manual control (S105 or S107) is performed after the automatic control (S104 or S106), but in a state where the learning sufficiently progresses, the manual control is not performed and all the operations may be automatically controlled. In addition, in a state where the learning is not performed, the automatic control (S104 or S106) may not be performed.

In addition, here, an example in which the learning is used in both the operation of gripping the target and the operation of storing the gripped target in transport box 135 is illustrated, but the learning may be used in only one of them.

As described above, in picking system 100 according to the exemplary embodiment, the process of at least a part of the picking operations can be automatically controlled, so that the working amount of the operator can be reduced. Therefore, for example, since remote operations of a plurality of picking robots can be performed by one operator, the working efficiency can be improved.

In addition, regarding an operation which is difficult to automate or an operation which unnecessarily takes time in automatic control, the operator can perform the remote operation to improve the overall working efficiency.

In addition, since the range of automatic control can be increased by the machine learning, the working amount of the operator can be further reduced. Therefore, since the number of the picking robots that one operator can take charge can be further increased, productivity can be improved.

In addition, since there is no need to perform the teaching for each type of the target by using the machine learning, an increase in cost in a case where the types of the targets are large can be suppressed.

In addition, the operation histories of the picking robot operated by the operator are accumulated in a database server interposed on the network, so that gripping operation data successfully picked can be efficiently collected from the plurality of picking robots. Therefore, the machine learning can be efficiently performed.

In addition, in a field of the machine learning, there is a problem that good data is efficiently collected. Specifically, in order to allow the picking robot to mechanically learn the gripping operation, a huge amount of the gripping operation data is necessary. However, there is no way to automatically collect such huge amount of the gripping operation data. On the other hand, in the exemplary embodiment, in actual picking work, data that a person performs a remote operation of the gripping operation of the picking robot is used. Therefore, the operation data, which is successfully gripped, can be efficiently collected.

Exemplary Embodiment 2

In Exemplary embodiment 1 described above, an example, in which the picking robot is automatically controlled by using the learning result, is described. In the exemplary embodiment, an example, in which information for assisting a remote operation using a learning result is present, will be described. Moreover, in the following description, differences from Exemplary embodiment 1 will be mainly described and redundant description will be omitted.

Figure 12:
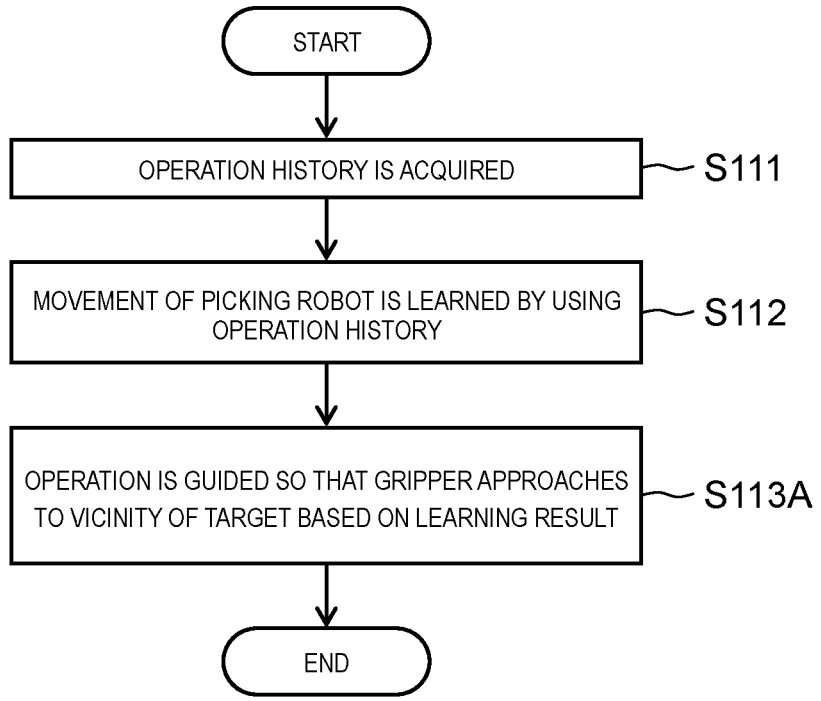
FIG. 12 is a flowchart of a learning process according to Exemplary embodiment 2.

FIG. 12 is a flowchart of a learning process in picking system 100 according to the exemplary embodiment. Moreover, the process illustrated in FIG. 12 includes step S113A instead of step S113 of the process illustrated in FIG. 7.

Figure 13:
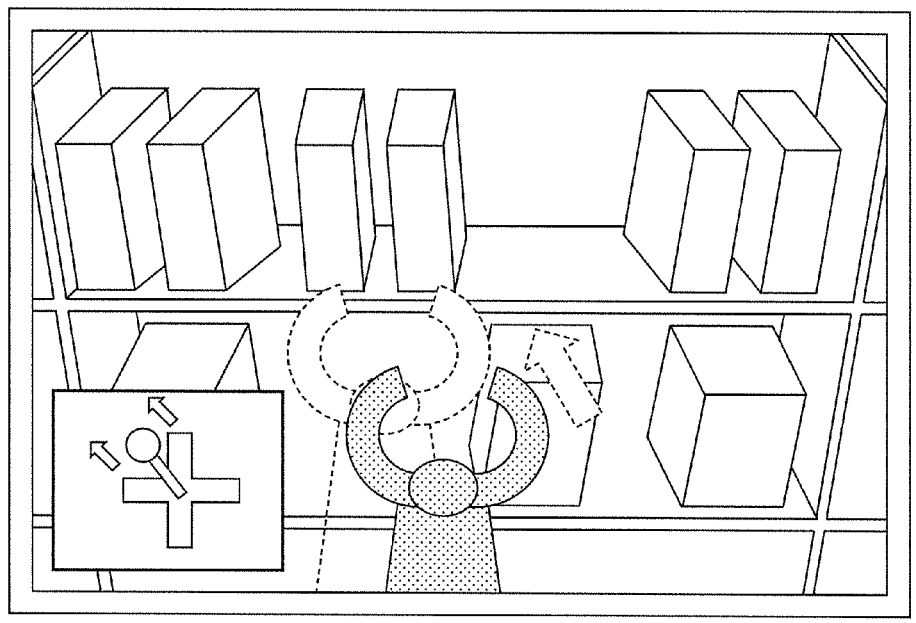
FIG. 13 is a view for explaining a display screen example according to Exemplary embodiment 2.

In step S113A, assisting unit 113 of remote operation device 103 presents to the operator information for guiding gripper 133 to a vicinity of the target based on the learning result of step S112. For example, as illustrated in FIG. 13, assisting unit 113 displays an operation method (direction of a lever, or the like) for guiding gripper 133 to the vicinity of the target on display unit 112. In addition, assisting unit 113 displays a trajectory of arm portion 132 and gripper 133 for guiding gripper 133 to the vicinity of the target on display unit 112. In addition, assisting unit 113 may issue a warning in a case where an operation of the operator is departed from an operation based on the learning result.

Moreover, a method of presenting these information to the operator is not limited to the display of the information, but may be voice notification, a control of vibration, a control of operation feeling, or the like. For example, in a case where the operation of the operator is departed from the operation based on the learning result, assisting unit 113 may issue warning by the vibration. Alternatively, assisting unit 113 may cause the operation of to operation unit 111 to be difficult (for example, to stiffen the lever to tilt) in a direction departed from the operation based on the learning result.

As described above, in picking system 100 according to the exemplary embodiment, since work of the operator can be assisted by the machine learning, a working time of the operator can be reduced. Therefore, since the number of the picking robots that one operator can take charge can be increased, the productivity can be improved.

Exemplary Embodiment 3

Figure 14:
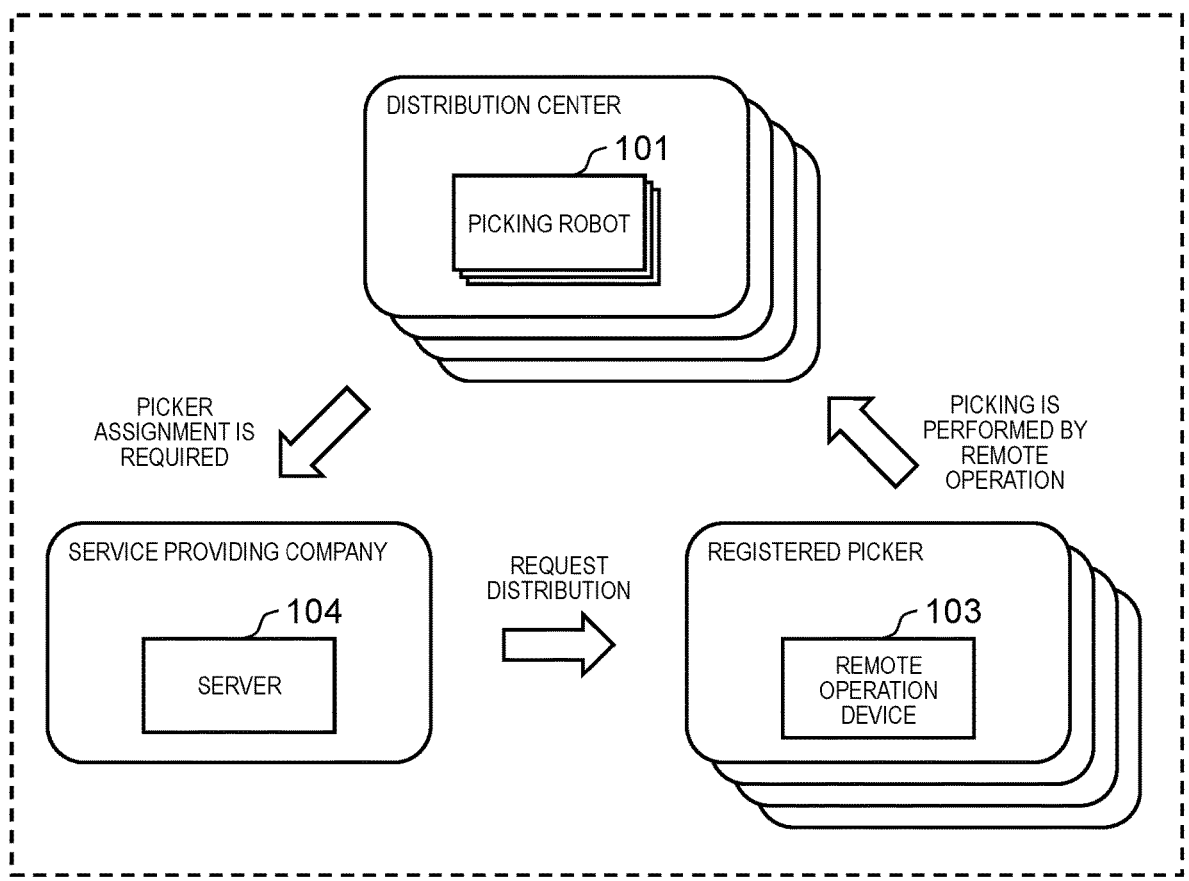
FIG. 14 is a view for explaining a charging system according to Exemplary embodiment 3.

In the exemplary embodiment, a charging system (business model) using picking system 100 according to the exemplary embodiments described above will be described. FIG. 14 is a view for explaining the charging system according to the exemplary embodiment.

As illustrated in FIG. 14, a plurality of picking robots 101 are disposed in each of a plurality of distribution centers. Each of the distribution centers (or a company operating the distribution center) sends a picker assignment request to a service providing company operating server 104.

In addition, a plurality of registered pickers are registered in the service providing company. The service providing company which receives the picker assignment request from the distribution center distributes the request to the plurality of registered pickers.

Each of the registered pickers confirms the distributed request and, for example, performs a remote operation of picking robot 101 by using remote operation device 103 installed at home.

In the system, for example, the service providing company collects a staffing fee from the distribution center. The registered picker acquires wages according to work directly from the distribution center, or via the service providing company.

In the system, the service providing company can assign a plurality of registered pickers existing in remote locations from the distribution center to work in each of the distribution centers. In addition, since the registered picker can perform work only for an arbitrary time from his/her home or a desired work place, a degree of freedom of the picker can be improved. Furthermore, since the service providing company can assign many registered pickers to each of the distribution centers according to a working amount at that time, personnel shortage in the distribution center can be reduced and personnel expenses can be reduced.

In addition, since the operator can perform the remote operation from a remote place, the operator can be released from a harsh work environment such as in a freezer or in a refrigerator.

In addition, since the remote operation can be performed via a network, a person in daytime can remotely operate the picking work at midnight by the remote operation from an area with time difference.

Although the picking system according to the exemplary embodiments of the present disclosure is described above, the present disclosure is not limited to the exemplary embodiments.

For example, a function of each device illustrated in FIG. 1 or the like is an example, a part or all of the processes performed in a certain device may be performed by another device or processes performed in a certain device may be distributed to and processed by a plurality of devices.

In addition, each processing unit included in each device in the picking system according to the exemplary embodiment is typically realized as an LSI which is an integrated circuit. These may be separately formed into one chip, or may be integrated into one chip so as to include a part or all of them.

In addition, the realization as the integrated circuit is not limited to the LSI, and may be realized by a dedicated circuit or a general-purpose processor. A Field Programmable Gate Array (FPGA) that can be programmed after manufacturing the LSI, or a reconfigurable processor capable of reconfiguring of connection and setting of circuit cells inside the LSI may be used.

In addition, in each of the exemplary embodiments described above, each configuration component may be configured by dedicated hardware, or may be realized by executing a software program suitable for each configuration component. Each configuration component may be realized by a program execution unit such as a CPU or a processor reading and executing a software program recorded on a recording medium such as a hard disk or a semiconductor memory.

Also, the present disclosure may be realized as a control method executed by the picking system.

A division of functional blocks in the block diagram is merely an example, and a plurality of functional blocks may be realized as one functional block, one functional block may be divided into plural, or some functions may be transferred to another functional block. Also, a single hardware or software may process the functions of a plurality of functional blocks having similar functions in parallel or in time division.

In addition, the order in which the respective steps in the flowchart are executed is for the purpose of illustrating the exemplary embodiments in detail, and may be an order other than those described above. Also, a part of the above steps may be executed simultaneously (in parallel) with other steps.

Although the picking system according to one or a plurality of aspects is described based on the exemplary embodiments above, the present disclosure is not limited to the exemplary embodiments. As long as not deviating from the gist of the present disclosure, modes in which various modifications conceived by those skilled in the art are applied to the exemplary embodiments, and forms configured by combining configuration elements in different exemplary embodiments also fall within the scope of one or a plurality of exemplary embodiments.

INDUSTRIAL APPLICABILITY

The present disclosure can be applied to a picking system used in the distribution center or the like.

REFERENCE MARKS IN THE DRAWINGS

100 PICKING SYSTEM
101 PICKING ROBOT
102 CAMERA
103 REMOTE OPERATION DEVICE
104 SERVER
111 OPERATION UNIT
112 DISPLAY UNIT
113 ASSISTING UNIT
121 RECORDING UNIT
122 LEARNING UNIT
131 MOVING PORTION
132 ARM PORTION
133 GRIPPER
134 TRANSPORTER
135 TRANSPORT BOX

What is claimed is:

1. A picking system comprising:
   a picking robot for gripping a target;
   an operation unit for an operator to perform a remote operation of the picking robot;
   an operation history record unit configured to record a plurality of picking operations with picking times, each picking time required for the picking robot to pick an object in a respective picking operation;
   a learning unit that learns a movement of the picking robot when the target is gripped by the remote operation from, among the plurality of picking operations, a portion of the plurality of picking operations, the portion with picking times being less than a threshold time; and
   an assisting unit that assists the remote operation based on a learning result of the learning unit.

2. The picking system of claim 1,
   wherein the picking robot includes
   an arm portion, and
   a gripper that is connected to the arm portion and grips the target, and
   wherein the assisting unit manipulates the arm portion based on the learning result, so that the gripper moves to a vicinity of the target.

3. The picking system of claim 1,
wherein the picking robot includes
an arm portion, and
a gripper that is connected to the arm portion and grips the target, and
wherein the assisting unit presents the operator information for guiding the gripper to a vicinity of the target based on the learning result.

4. The picking system of claim 1,
wherein the learning unit learns the movement of the picking robot when the target is gripped for each type of the target.

5. The picking system of claim 1, further comprising:
a camera that images the target,
wherein the learning unit learns the movement of the picking robot when the target is gripped using an image obtained by the camera and an operation state of the picking robot during the remote operation, the image and the operation state being obtained in time series.

6. The picking system of claim 5,
wherein the operation state of the picking robot includes a torque and an angle of a joint of the picking robot.

7. A method for controlling a picking system including a picking robot for gripping a target, and an operation unit for an operator to perform a remote operation of the picking robot, the method comprising:
an operation history record step of recording a plurality of picking operations with picking times, each picking time required for the picking robot to pick an object in a respective picking operation;
a learning step of learning a movement of the picking robot when the target is gripped by the remote operation from, among the plurality of picking operations, a portion of the plurality of picking operations, the portion with picking times being less than a threshold time; and
an assisting step of assisting the remote operation based on a learning result of the learning step.

* * * * *